METHOD AND APPARATUS FOR CLEARING A MAGNETIC MEMORY

Filed May 12, 1965 3 Sheets-Sheet 1

INVENTOR.
MORRIS O. STEIN
BY
PAUL W. FISH.
AGENT.

Feb. 17, 1970 M. O. STEIN 3,496,554

METHOD AND APPARATUS FOR CLEARING A MAGNETIC MEMORY

Filed May 12, 1965 3 Sheets-Sheet 3

United States Patent Office 3,496,554
Patented Feb. 17, 1970

3,496,554

METHOD AND APPARATUS FOR CLEARING A MAGNET MEMORY

Morris O. Stein, Livonia, Mich., assignor to Burroughs Corporation, Detroit, Mich., a corporation of Michigan Filed May 12, 1965, Ser. No. 455,102
Int. Cl. G11b *5/00*
U.S. Cl. 340—174 15 Claims

ABSTRACT OF THE DISCLOSURE

In a magnetic core memory matrix having row and column select windings, each carrying substantially half-select current and including an inhibit winding designed to carry normally only half-select current, wherein an otherwise selected core will not switch if the inhibit winding is activated, the cores are reset by a full-select pulse through the inhibit winding, the pulse being duration and amplitude controlled to avoid overheating the inhibit winding. For reset a capacitor discharges through the inhibit winding and the duration and amplitude of the reset pulse are controlled by the characteristics of the capacitor, current limiting resistors of the inhibit winding circuit, and a threshold biased timing means which may be a diode clamp. In some circuits the threshold biased timing means is not required for adequate pulse duration and amplitude control.

This invention relates to an information storage device and more particularly, to an improved method and apparatus for resetting cores of a three dimensional magnetic memory array.

Memory systems utilizing bistable magnetic elements are well known in the data processing and computer arts. A conventional magnetic core matrix comprises a plurality of bistable magnetic cores arranged in a coordinate array, for example, rows and columns. A plurality of separate coordinate selections means are conventionally utilized to select an individual core in the coordinate array by means of coincidence current techniques. In the coincidence current techniques the row and column windings are arranged such that energization of one row and one column winding coincidentally develops a magnetomotive force sufficient to switch a single core linked by both windings from one stable state to the other. The amplitude of the selection current applied to a selected row or column winding is conventionally insufficient in and of itself to effect a change of state of any bistable magnetic elements linked by a single energized winding.

Binary information to be stored in such a magnetic memory array is first encoded with one stable state of the magnetic elements arbitrarily chosen to represent the binary zero and the other stable state chosen to represent the binary one. As is known in the art, information thus stored in a magnetic array may be read out by driving a particular core toward a predetermined state and sensing whether a change of state occurs. The sensing is accomplished by means of a sense winding coupled to the cores of an array whereby if a core changes state a suitable voltage pulse is induced in its sense winding.

Conventional magnetic core storage systems generally employ a plurality of planes, each having coordinately arrayed storage elements in a two-dimensional array. These coordinate arrays are arranged in a plurality of parallel planes with corresponding row and column windings in each plane connected in series so that coincidence energization in one row and one column applies a magnetomotive force to like cores, i.e., cores located in a corresponding position in the plurality of parallel planes.

The several cores common to a given combination of row and column windings generally comprise a word or digit storage register wherein a multibit word or digit may be stored. Each plane of the array corresponds to one bit position in each register and a separate bit value control winding, commonly known as the inhibit winding, is provided for each plane. An inhibit winding and a bit sense winding, as well, commonly link all cores in a particular plane.

A data word is written into a selected register position in an array by energizing a particular pair of row and column windings corresponding to the register position with a half select current. The coincidence of these currents drive all the selected cores to the binary one state in the absence of the simultaneous energization of the inhibit windings. The inhibit winding conventionally carries a current substantially equal in amplitude to that carried by the row and column windings in a direction to drive the selected cores toward the binary zero state. Thus the current in the inhibit winding of a plane, cancels the effect of one of the pair of row and column currents in the windings and thus results in a net magnetomotive force less than that required to switch a core from one stable state to the other.

During operation of such a magnetic memory, it is often desirable to be able to reset the memory, i.e., to return all cores to a particular state, for example, the zero state. While it is possible to employ a separate winding to accomplish the reset function, it is desirable to maintain the number of windings linking the magnetic elements to a minimum. This is particularly true with magnetic cores as the number of windings fixes a practical lower limit for the inner toroidal diameter. Further, unnecessarily increasing the number of windings makes it more difficult to fabricate a magnetic memory as well as unnecessarily increasing the cost. Additionally, increasing the windings may unnecessarily result in increased cross-talk wehrein a current carried by one conductor threading a particular core may result in an unwanted signal being induced in another winding threading the same core because of its close proximity to the first conductor.

Further, it is desirable to utilize the same wire size for all core windings in order to simplify the fabrication of a coincident current magnetic memory plane. However, as is known in the art, the resistance, and therefore, the safe current carrying capability of a particular wire size is a function of its length, area, and resistivity. Where a single wire has been utilized in the prior art to perform a resetting function in a coincident current memory, it has been conventional to design the wire with a capacity to carry ordinarily the full amplitude current required to switch the magnetic elements. In a coincident current type memory, the full amplitude resetting current is conventionally equal to at least twice the half-select value normally carried by the row, column and inhibit windings during the normal operation and therefore the wide variation in the values of current carried by the various windings during the normal memory and reset operations respectively dictated the use of two different wire sizes to fabricate the respective inhibit and reset windings.

It is therefore the principal object of the present invention to simplify the construction and operation of multi-group magnetic core storage systems.

It is another object of the present invention to dually utilize the inhibit windings to accomplish an inhibit or alternately a reset function in a multiplexed operating mode.

It is a further object of the present invention to efficiently utilize the conductors of a multi-group magnetic core memory array in a time-sharing mode.

It is a still further object of the present invention to provide an improved, amplitude and duration control circuit for resetting the magnetic cores of a multi-plane memory array.

It is a further object of the present invention to prevent overheating conductors utilized to simultaneously reset all the cores of a plane of a magnetic core memory array.

In accomplishing the above and other desirable features applicant passes a full amplitude reset current for a predetermined time through the inhibit windings, which individually link all cores in a particular plane of a three-dimensional magnetic core array, to switch all the cores to a binary zero state thereby effecting the reset or clearing of the memory. The duration of the full amplitude reset current which is conducted through the inhibit windings is limited in amplitude and duration to prevent the overheating of the conductors which are designed to carry normally only a half-select current to selectively inhibit the switching of the cores in a particular plane during the normal read-write operation.

When the magnetic cores are to be reset, a charged capacitor of an RC timing circuit discharges through the inhibit winding conductor and a portion of the current limiting resistors of the inhibit current circuit. A full amplitude reset current is conducted through the inhibit winding conductor to reset the cores and thereafter the current conducted through the inhibit winding is limited in amplitude and duration by the discharge characteristics of the capacitor and a threshold diode clamp. The diode clamp is forward biased during a first portion of the decay of the capacitor's charge and reverse biased thereafter. The amplitude of the reset current through the inhibit winding conductor drops sharply upon the reverse biasing of the diode. Alternately, the duration of the full amplitude reset current may be limited solely by a portion of the resistors of the inhibit current circuit and the discharge characteristics of an initially charged capacitor. In either event, the amplitude and duration of the reset current is controlled to prevent the overheating of the inhibit winding conductor which is capable of normally carrying only a half-select amplitude current.

For a more complete understanding of applicant's invention and the various embodiments thereof, reference may be had to the following detailed description in conjunction with the drawings in which.

FIGS. *5a* and *5b* are waveforms illustrating the amplitude-duration control of a reset current in accordance with the principles of applicant's invention.

Figure 6:
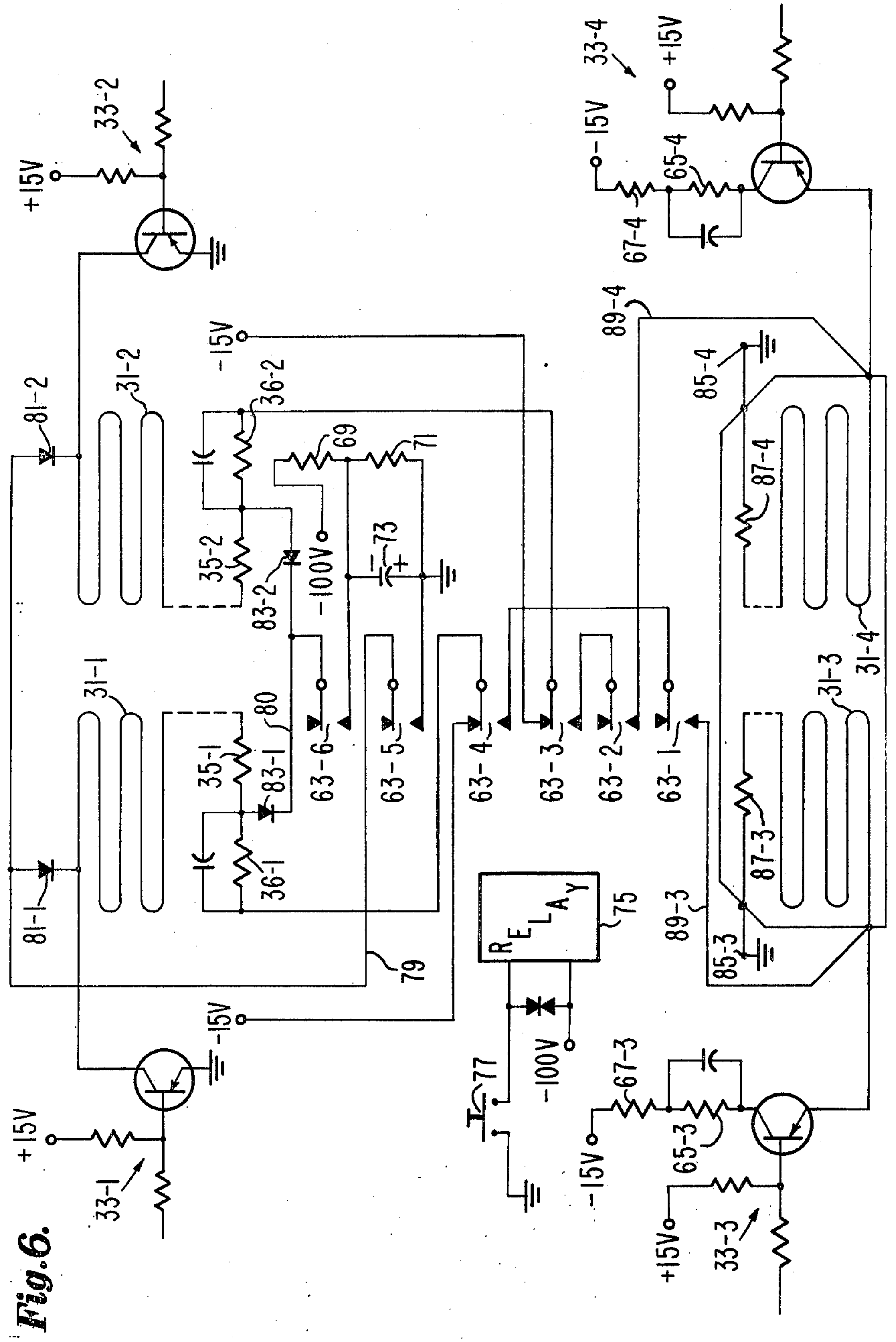

FIG. 6 is a schematic diagram of a relay controlled inhibit-reset circuit in accordance with another aspect of applicant's invention.

Figure 1:
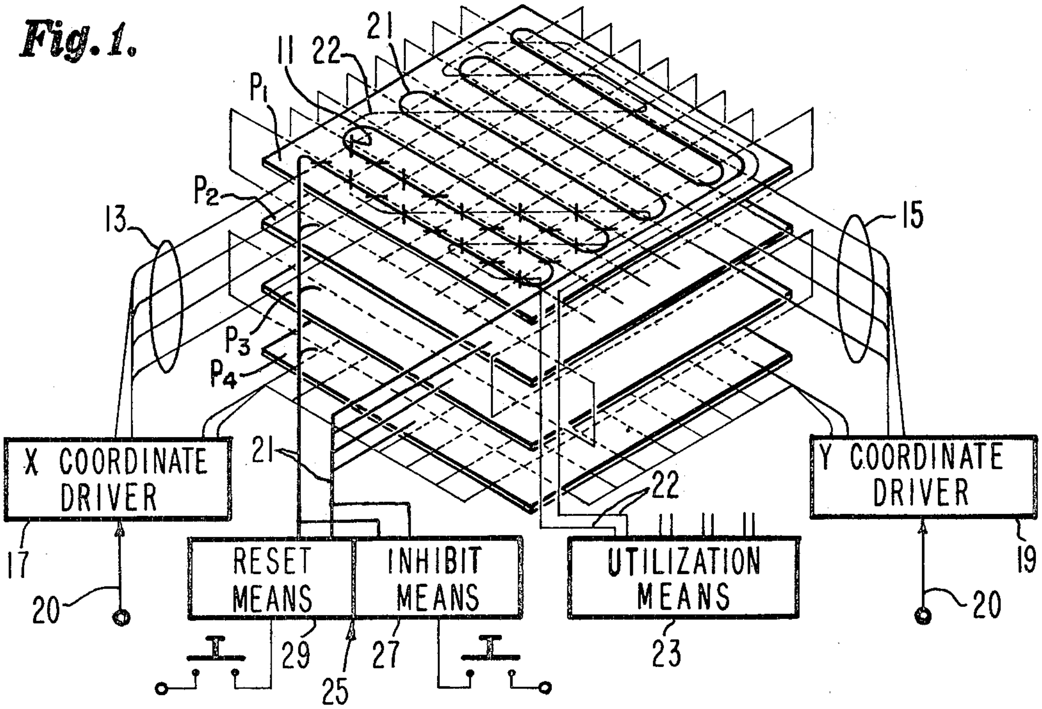
FIG. 1 is a diagram of a magnetic memory system partially in block form, embodying the dual utilization of an inhibit reset winding in accordance with the principles of applicant's invention.

Referring now to FIG. 1 there is shown a diagram of a magnetic memory system which embodies the dual utilization of the inhibit windings in accordance with the principles of applicant's invention to selectably accomplish the inhibit and reset functions, respectively. As shown, the magnetic memory system comprises a plurality of substantially parallel planes $P_1$ through $P_4$. The magnetic cores 11 in each plane are coordinately arrayed with the respective row and column conductors 13 and 15 linking like cores in each plane. The X and Y coordinate drivers 17 and 19 receive appropriate input signals at terminals 20 and, in a response thereto, deliver in accordance with the customary coincident current selection technique the appropriate magnitude of current to the selected row and column conductors 13 and 15. Further in accordance with the standard operating procedure for a three-dimensional coincident current magnetic memory system an inhibit winding as 21 is provided for each memory plane. The inhibit winding 21 of each plane links all cores in that plane. Also linking the cores in each plane is an output or sense winding 22 which is coupled to the individual cores and to output or utilization means 23 such as or including a sense amplifier, one of which is provided for each plane.

In accordance with the principles of applicant's invention, associated with each inhibit winding 21 is a separately energizable dual driver 25 only one being shown whereby, as hereinafter will be more fully explained, the inhibit winding 21 may be selectively energized by either an inhibit means 27 or a reset means 29. In response to the energization of the inhibit driver means 27 an appropriate half-select current is passed through the inhibit winding 21 to accomplish the normal inhibit function during the writing operation. In response to the energization of the reset network circuit means 29 a full magnitude reset current is conducted through the inhibit winding thus clearing all cores in that particular memory plane.

As hereinabove stated, the several cores having like addresses in the respective memory planes comprise a word or digit storage register. The like cores of each plane correspond to one bit position in each register. A word or digit is written into a selected register position by energizing the appropriate row and column windings 13 and 15 which selectively link the cores which comprise the register position with a half-select current on each winding, i.e., row and column, such that in the absence of the simultaneous energization of the inhibit driver 27, all cores in the selected memory register will be driven to the binary one state. The inhibit winding 21 when actuated by inhibit means 27 conducts a current substantially equal in magnitude to that carried by the row or column windings; however, the direction of the inhibit current is such that its magnetomotive force cancels the effect of one of the row or column windings thus resulting in a net flux in the core which is less than that required to switch it from one stable state to the other.

In accordance with the principles of applicant's invention, reset means 29 may be selectively coupled to the inhibit winding 21 such that initially a full amplitude reset current pulse flows in the inhibit winding 21, thus resetting all cores linked thereby. After a predetermined time the amplitude of the reset current is abruptly lowered below the full switching level and continues to flow for another predetermined time. The duration and amplitude of the respective reset current levels is such that even though the inhibit winding is designed to customarily carry a half-select current, the application of the duration and time controlled reset current does not result in any undesirable overheating of the inhibit winding.

Figure 2:
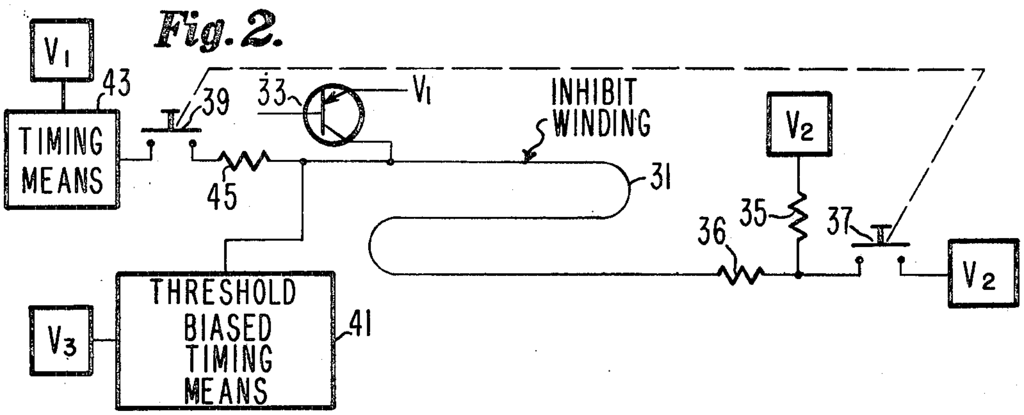
FIG. 2 illustrates a partial schematic diagram of circuitry for dually utilizing the inhibit windings to inhibit or reset a group or magnetic elements of a magnetic memory array in accordance with the principles of applicant's invention.
Figure 5:
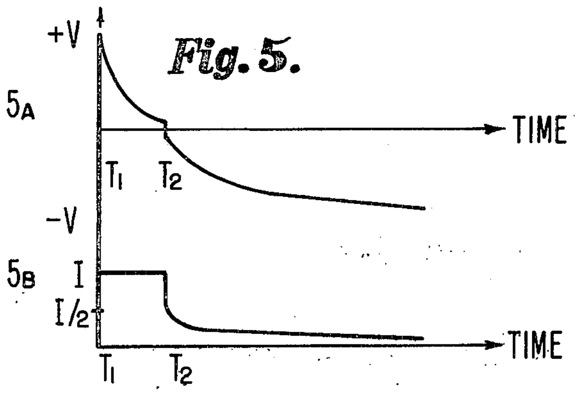

Referring now to FIG. 2 there is shown a partial schematic diagram of circuit means for dually utilizing the inhibit winding to accomplish on a time-sharing basis the respective inhibit and reset functions. The conductor 31 represents the inhibit winding which would selectively link all cores in a particular plane of a three-dimensional magnetic memory system. In the inhibit mode a current equal to the half-select amplitude is conducted through inhibit driver transistor 33 and resistors 35 and 36 which are coupled across an appropriate potential source, for example $V_1$ and $V_2$. The magnitude of resistors 35 and 36 is chosen to limit the current to the half-select level.

To utilize the inhibit winding to reset all the cores linked thereby in a particular memory plane it is necessary to conduct a full amplitude reset pulse through conductor 31. Thus, the current conducted through the inhibit winding during the reset mode must be approximately double that conducted during a normal inhibit function. A suitable actuating means, not shown, is utilized to simultaneously actuate switches 37 and 39, which as shown, are mechanically coupled, to initiate the reset operation. When the switches are initially closed, a current path exists through the conductor 31 from source $V_2$ through the switch 37, resistor 36, the inhibit winding, resistor 45, switch 39 and timing means 43 to potential source $V_1$. Another current path exists from source $V_1$ through timing means 43, switch 39, resistor 45 and threshold biased timing means 41 to source $V_3$.

In accordance with applicant's invention the amplitude of current conducted through both current paths is time dependent. After a predetermined time, source $V_3$ is disconnected by threshold biased timing means 41 thereby converting the previous two current paths into a single series current path comprising source $V_2$, switch 37, resistor 36, the inhibit winding 31, resistor 45, switch 39, timing means 43 and source $V_1$. Thus a first current level flows in the inhibit winding conductor 31 for a first predetermined time governed by threshold biased timing means 41 and thereafter the level is abruptly reduced and this latter level continues to flow for a second predetermined time governed by timing means 43.

As will be evident to those skilled in the art, the relative magnitude and polarity of the respective sources of potential may be chosen to vary the direction as well as the magnitude of the reset current. The sense of the respective inhibit windings as well as the value of the current limiting resistors would be designed in accordance with the magnitude of the respective sources of potential. Similarly the sequence of the full and reduced amplitude reset current could be reversed, in which case the duration of the controlled full amplitude reset pulse would flow after a predetermined time during which a lower amplitude pulse flowed. For example, this could be accomplished by charging a timing capacitor with a lower amplitude current and subsequently utilizing the charge in the capacitor to forward bias threshold sensitive means for a second predetermined time thereby developing the full reset current.

Figure 3:
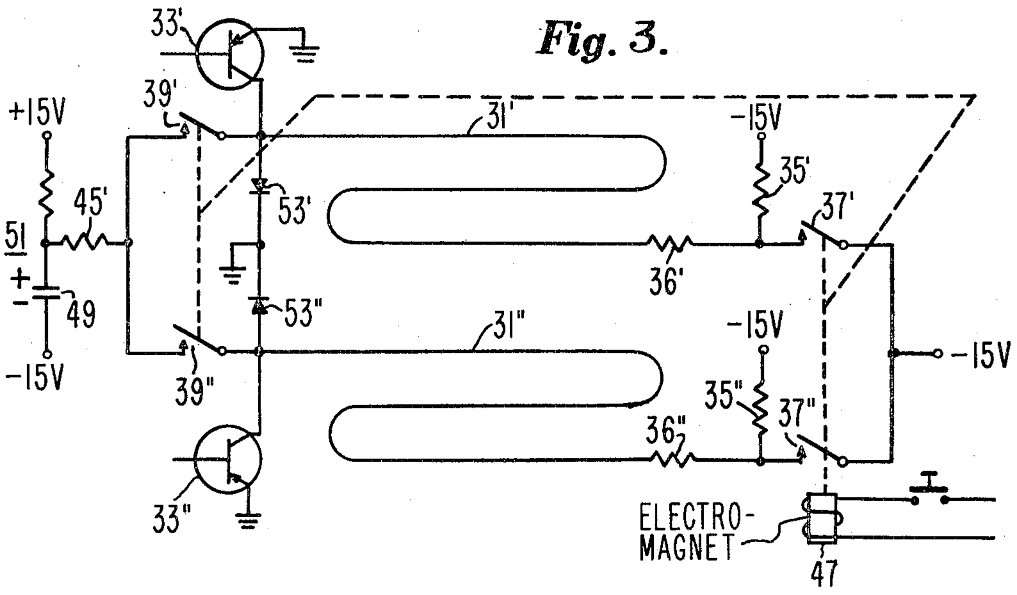
FIG. 3 is a schematic diagram of an inhibit-reset circuit embodying the principles of applicant's invention.

Referring now to FIG. 3 there is shown a first circuit configuration emboding the principles of applicant's invention. The inhibit winding conductors 31′ and 31″ are, as hereinabove stated, respectively associated with the cores on two planes of a magnetic memory system. During the inhibit mode a half-select current is conducted through the respective inhibit winding conductors 31′ and 31″ when inhibit driver transistors 33′ and 33″ are respectively conducting. The path for the current flow during the inhibit mode of operation for inhibit conductor 31′, for example, includes the −15 volt source of potential, resistors 35′ and 36′, inhibit winding conductor 31′, transistor 33′ and a source of reference potential, for example, ground. The value of the respective resistors and potential sources are chosen such that the magnitude of current flowing during the inhibit function is approximately equal to the desired half-select value. During the reset mode a first magnitude of current is conducted through the respective inhibit winding conductors 31′ and 31″ for a first predetermined time interval and thereafter, a second level of current, lower than the first level, is conducted through the respective inhibit winding conductors.

As the structure and operation of the two halves of the symmetric, dual utilization circuit means shown in FIG. 3 are identical, only one-half of the circuit will be explained in detail. For convenience, like components of the symmetrically configured circuits have been similarly numbered.

In the reset mode, switches 37′ and 39′ are controlled by the selective energization of electromagnet 47. The switches 37′ and 39′ are mechanically coupled as shown and, when closed, result in the initial formation of two current paths. The first current path may be referred to as the reset path and the second current path may be considered as the biased time duration control path. Considering the second path first, capacitor 49 of series RC circuit 51 is initially charged to a first potential level, for example, the 30 volts as shown. When switch 39′ initially closes, the charge on capacitor 49 begins to discharge through resistor 45′ and forward biased diode 53′ which are selectively coupled between one terminal of capacitor 49 by switch 39′ and a source of reference potential, for example, ground. Similarly when switch 37′ which is mechanically coupled to switch 39′, closes, a minimum 15 volt potential source is applied through resistor 36′ to one end of the inhibit conductor 31′ while the other end of the inhibit conductor is connected to the junction of the diode 53′ and switch 39′.

Initially, capacitor 49 discharges through resistor 45′ and the forward resistance of diode 53′. Thus the junction of switch 39′ and diode 53′ is clamped at a level equal to the forward drop of diode 53′. During this condition, i.e., when diode 53′ is forward biased, the current through the inhibit winding conductor 31′ is limited essentially by the value of resistor 36′ and the potential across the inhibit winding, i.e., the minus 15 volts plus the forward drop of the diode, which approximates 15 volts. Thus, initially, the current through the inhibit winding is double because closed switch 37′ has essentially short-circuited resistor 35′ which is substantially equal in value to resistor 36′ and the potential difference across the circuit is approximately the same.

The current in the second or time controlling branch continues to flow at a level determined by the characteristic discharge curve of capacitor 49, resistor 45′ and the forward resistance of diode 53′. As the voltage on capacitor 49 falls below the reference or ground level, the second current path is opened, i.e., diode 53′ becomes back biased. Thereafter, a reduced amplitude current is conducted through a path including the minus 15 volt potential source, closed switch 37′, resistor 36′, the inhibit winding conductor 31′, closed switch 39′, resistor 45′ and the capacitor 49. Current continues to flow through this last mentioned path, until the capacitor is fully discharged. Thus by utilizing threshold biased, duration controlled current paths, applicant permits a first level of current to flow through the inhibit winding for a first predetermined time and thereafter automatically decreases the level of current and permits this lower level of current to continue to flow for a second predetermined time.

As would be evident to those skilled in the art, a plurality of such amplitude and time duration circuit means may be employed to selectively apply a duration and amplitude controlled reset current through the inhibit windings of a plurality of planes of a magnetic memory system. The respective values of the capacitor 49 and resistor 45′ would be accordingly chosen to accommodate the increased number of parallel discharge paths thereby facilitating the simultaneous application in parallel of time and duration control reset pulses to a plurality of inhibit windings associated with the respective planes of a magnetic memory system.

Figure 4:
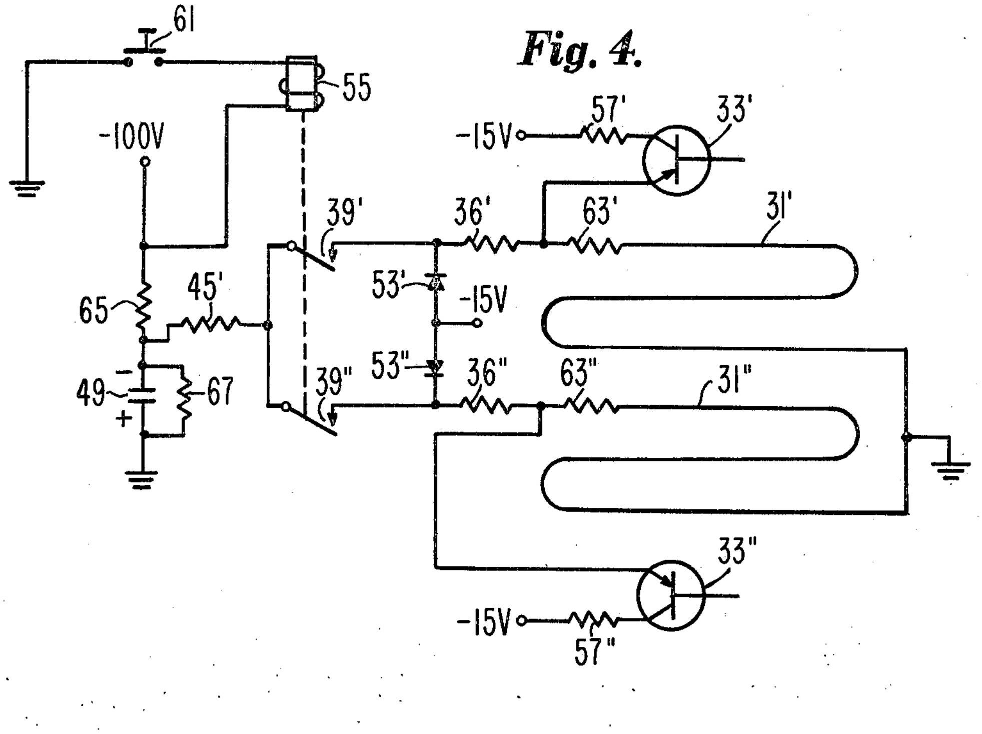
FIG. 4 is a schematic diagram of another inhibit-reset circuit embodying the principles of applicant's invention.

Referring now to FIG. 4, there is shown another circuit embodying the principles of applicant's invention for dually utilizing the inhibit windings to selectively inhibit the switching or alternately to reset a group of magnetic cores of a three-dimensional magnetic memory array. As in FIG. 3, FIG. 4 illustrates a symmetric dual reset circuit in which two inhibit winding conductors 31′ and 31″ represent the inhibit windings of two separate planes of a magnetic memory array. Again, as in FIG. 3 the structure and operation of the respective halves of the symmetric circuits are identical and therefore only one-half will be discussed. Further, for convenience, corresponding parts in FIGS. 3 and 4 are correspondingly numbered.

During the inhibit mode, transistors 33' and 33'' are operated in the switching mode to selectively deliver a current substantially equal to the half-select level to the inhibit winding conductors 31' and 31''. Resistors 57' and 57'' in the collector circuits are shown to limit the current through the respective inhibitor conductors 31' and 31'' to the desired one-half select level. During the inhibit mode, the inhibit winding is essentially connected across a 15 volt source of potential, i.e., one end is coupled to a reference source, for example, ground, and the other is connected through a conducting transistor to a 15 volt source through collector resistor 57'. An additional matching or balancing resistor 63' may be utilized during the inhibit mode to compensate for any variations in the load seen by a standard inhibit driver circuit. The value of the balancing resistors utilized by applicant in representative magnetic core systems employing transistorized inhibit drivers have been in the order of a few ohms and therefore the magnitude of the inhibit current is primarily determined by current limiting resistors 57' and 57'' in the collector circuit of transistors 33' and 33''.

In the reset mode, a first level of current, substantially equal to the full reset ampitude required to reset the cores, is conducted through winding conductors 31' and 32''. A switch controlled solenoid 55 connected essentially across a −100 v. potential source to ground, is provided to selectively close mechanically coupled switches 39' and 39''.

As hereinabove discussed with respect to FIG. 3, the amplitude and duration control circuit in accordance with applicant's invention comprises an RC timing circuit and first and second discharge paths. The first current path in the embodiment shown in FIG. 4 comprises a discharge path for the series RC circuit including normally open switch 39', resistor 45' and an asymmetrically current conductive device 53' coupled between the junction of the RC circuit and a minus 15 volt source of potential. The second discharge path for the series RC timing circuit comprises resistor 36', balancing resistor 63', inhibit winding conductor 31', coupled between the junction of the resistor 45' and diode 53' of the first path and a source of reference potential, for example, ground. Any suitable voltage divider network may be employed to initially charge capacitor 49. As shown, a voltage divider comprising resistors 65 and 67 is utilized to develop an initial charge of approximately thirty volts across capacitor 49.

In operation, when switch 61 is actuated, solenoid 55 closes switch 39'. Prior to the closing of switch 39' by solenoid 55, capacitor 49 was initially charged to a first potential level, for example, −30 volts. When switches 61 and 39' initially close, the initial charge on capacitor 49 forward biases diode 53', thereby establishing one current path. Simultaneously, another current path exists from the source of reference potential through the respective inhibit winding conductor 31', resistors 63' and 36', and resistor 45' of the first circuit path. When capacitor 49 has discharged below the level of the potential source coupled to the anode of diodes 53', diode 53' becomes back biased and thereafter a second current level, lower than the initial level, is conducted through the inhibit winding conductor 31', resistors 63' and 36', closed switch 39', resistor 45' to one terminal of capacitor 49. Thus, the initial full amplitude current which was conducted through the inhibit windings is abruptly reduced after a predetermined time to a second level thereby selectively applying a full amplitude current for a predetermined time to reset the cores linked by the inhibit conductor 31'.

Referring now to FIGS. *5a* and *b*, there are shown idealized waveforms graphically depicting the operation of applicant's amplitude and duration controlled reset circuitry of FIG. 3 in the reset mode. FIG. *5a* shows a voltage-time waveform in which the charge on capacitor 49 is initially at +V volts. At time $T_1$ which corresponds to the closing of switch 39' the capacitor begins to discharge at a first characteristic rate which is, as hereinabove stated, proportional to the value of resistor 45' plus the forward resistance of diode 53'. Capacitor 49 continues to discharge at this rate until $T_2$ when it reaches a level substantially equal to the forward drop of diode 53'. At this time, the capacitor begins to discharge at a second rate proportional to the combined value of resistors 36' and 45' plus the resistance of the inhibit winding conductor 31'. The capacitor 49 continues to discharge at this second rate until the capacitor is fully discharged or the switching means 39' is opened.

Referring now to FIG. *5b* there is shown a current-time waveform depicting the idealized values of current flowing in the inhibit conductors 31' and 31'' at times corresponding to those indicated in conjunction with FIG. *5a* above. At $T_1$ an initial value of current substantially equal to the full reset amplitude begins to flow. This value of current flows until time $T_2$ at which time the amplitude drops sharply. Thereafter, the latter magnitude of current exponentially decreases as capacitor 49 continues to discharge. By designing the initial charge and rate of discharge, the time duration of the full amplitude reset current may be selectively controlled in accordance with the principles of applicant's invention such that the energy losses, i.e., the heating of the inhibit winding, may be kept within limits such that the conductors utilized to fabricate the inhibit windings, while designed normally to carry a half-select current, will not be overheated by the momentary application of a full reset current pulse.

Referring to the embodiment of FIG. 6, there is shown a relay controlled multi-plane inhibit-control circuit in accordance with another of the aspects of applicant's invention. Inhibit drivers 33–1, 33–2, 33–3 and 33–4 are used during the inhibit mode to selectively develop a half-select current to be conducted through the associated inhibit winding conductors 31–1, 31–2, 31–3 and 31–4 of the planes of a magnetic memory. During the inhibit mode, a selected transistorized driver 33–1 through 33–4 is rendered conductive by an appropriate signal applied to its base electrode. In response to an appropriate signal, inhibit current is conducted through, for example, inhibit windings 33–1 through the series circuit including resistors 35–1 and 36–1 to a source of bias potential, for example −15 volts.

In order to utilize a standard inhibit driver, the drivers associated with the respective inhibit windings 31–1 and 31–2 are returned through the inhibit windings, the series current limiting resistors 35–1, 36–1 and 35–2, 36–2, to the source of reference potential, i.e., −15 volts as shown, through the normally closed contacts 63–3 and 63–4 of the six pole relay 63. The inhibit drivers associated with inhibit windings 31–3 and 31–4 are returned directly to a source of reference potential, for example, ground, with the current limiting resistors 65–3 and 67–3 and 65–4 and 67–4 for the inhibiting mode disposed between the collector electrode of transistorized drivers 33–3 and 33–4 and the source of minus 15 volt biasing potential. By utilizing the above explained variation for biasing the inhibit driver, it is possible to utilize a standard, uniform driver to accomplish the reset function in a four-plane memory.

As hereinabove stated, during the reset mode of operation it is necessary to conduct a full amplitude reset current through the respective inhibit winding conductors in order to develop a sufficient magnetomotive force to switch the magnetic elements linked by the conductor to a common or reset condition. In accordance with the principles of applicant's invention a full magnitude reset current is conducted through the inhibit windings for a predetermined time in order to avoid overheating the inhibit winding conductors which are designed to carry normally a half-select current. The timing circuit in the embodiment of applicant's invention shown in FIG. 6 comprises a voltage divider including serially disposed resistors 69 and 71 coupled across an appropriate source of potential, for example −100 volts and ground, and a capacitor 73 coupled between the junction of resistors 69 and 71 and ground. Thus through the normal voltage divider operation capacitor 73 is normally charged minus-plus, as shown, to a value of approximately 40 volts. The value of the capacitor 73, its initial or charged voltage and the equivalent resistance of the respective inhibit conductors and their associated current limiting resistors will be chosen, in accordance with the principles of applicant's invention, to limit the amplitude and duration of the full amplitude reset current pulse. The amplitude and duration of the reset current will be designed to prevent undesirable overheating of the conductor, which ordinarily carries a half-select current, while permitting the generation of a magnetomotive force sufficient to reliably switch all magnetic elements linked by the conductor.

Relay 75, when selectively connected across an appropriate source of potential by means of switch 77, is utilized to selectively control the positioning of the contacts 63–1 through 63–6. In the normal position, as shown, the contacts are positioned to accomplish the inhibit function. In the actuated position, i.e., opposite to that shown, the relay contacts 63–1 through 63–6 are positioned to accomplish the reset function. In the reset mode capacitor 73 is discharged through the respective inhibit winding conductors 31–1 through 31–4 of the four planes of the magnetic memory in parallel, thus conducting through the respective inhibit windings a duration controlled, full amplitude reset current. The current paths for the respective inhibit conductors during the reset mode may conveniently be divided into two similar groups.

Referring now to a first group comprising the respective inhibit conductors 31–1 and 31–2, a series-parallel current path for the reset mode comprises a series path from the reference potential, i.e., ground, at one terminal of capacitor 73 through relay contact 63–5, conductor 79 to the common junction of isolating diodes 81–1 and 81–2. From the junction of the isolating diodes 81–1 and 81–2 parallel paths exist through the respective inhibit windings 31–1 and 31–2, associated resistors 35–1 and 35–2, and diodes 83–1 and 83–2. From the common junction of diodes 83–1 and 83–2 a series path comprising conductor 80 and relay contacts 63–6 completes the path to the ungrounded terminal of capacitor 73.

The reset path for the second group comprising the respective inhibit windings 31–3 and 31–4 comprises a similar parallel-series circuit from, for example, ground at terminals 85–3 and 85–4, adjacent the inhibit drivers, through resistors 87–3 and 87–4, the respective inhibit conductors 31–3 and 31–4, conductors 89–3 and 89–4, paired relay contacts 63–1 and 63–4 and 63–2 and 63–3, resistors 36–1 and 36–2, diodes 83–1 and 83–2, contact 63–6 and conductor 80 to the ungrounded terminal of capacitor 74.

Thus it is seen that in the embodiment of applicant's invention as shown in FIG. 6, the reset mode of operation is accomplished by utilizing parallel paths including the respective inhibit winding conductors to discharge capacitor 73 when the multi-contact relay switch 63 is moved from the rest position, as shown, to the actuated position in response to the energization of relay 75.

In order to develop a full magnitude reset current the pairs of current limiting resistors 35–1, 36–1 and 35–2, 36–2 associated respectively with inhibit windings 33–1 and 33–2 during the inhibit mode are individually adapted to function as the current limiting resistor for the respective four inhibit winding conductors. Thus in the reset mode the effective resistance of each winding is essentially halved as resistors 35 and 36 are of substantially equal value and therefore a full amplitude reset current is developed through a path which is designed to carry a half-select amplitude current. Further, the normally charged capacitor 73 which is used to store the current utilized in the inhibit mode would normally impress across the initially closed contacts the full potential, thereby serving to clean or wet the contacts. Thus the potential utilized to develop the reset current insures the breakdown of any high resistive film which may develop during the normal switching operation. This cleaning or wetting of the contacts of the relay switch utilized to selectively control the application of a full reset current is equally applicable to the embodiments hereinabove described in conjunction with FIGS. 2, 3 and 4.

As will be evident to those skilled in the art, minor modifications may be made to accomplish the dual ultilization of any of a number of windings commonly employed in a coincident current magnetic memory array without departing from the spirit of applicant's invention. Similarly, minor modifications may be made by those skilled in the art in adapting circuit means for controlling the direction and amplitude of a reset current without departing from the scope of applicant's teaching which is set forth with particularity in the appended claims.

What is claimed is:

1. In a magnetic memory having a plurality of groups of coordinately arrayed magnetic elements, said elements exhibiting substantially square loop hysteresis characteristics and being selectively linked by a plurality of row conductors and a like plurality of column conductors for applying a magnetomotive switching force to preselected like ones of said magnetic elements of said groups, and additionally including means for selectively applying coincident selection currents to said row and column conductors, and a plurality of inhibit conductors designed to carry normally only a half-select current for applying a substantially half-switching magnetomotive force opposite in sense to that developed by said row and column conductors to all elements of individual ones of said groups for preventing the switching of said elements by said coincident currents, the improvement comprising:

combination means for selectively applying a half-switching amplitude inhibit current to one of said inhibit windings during a write operation mode and for selectively applying a duration and amplitude controlled full-switching current to said one inhibit winding during a reset operation mode.

2. The improvement defined in claim 1 wherein said combination means comprises switch controlled means and wherein said write operation mode and said reset operation mode are separately and independently selectable by said switch means.

3. A method for selectively resetting a group of magnetic elements of a multi-group magnetic memory array by utilizing a conductor designed to carry normally only a half-select current, said magnetic elements being switched by coincidence of two half-select currents in the opposite sense of the current in said conductor, comprising the steps of establishing first and second amplitude and duration dependent current paths wherein said second path includes said conductor, maintaining across said second path a substantially constant potential of a magnitude providing a full amplitude reset current while the current in said first path decays exponentially, and decreasing automatically and abruptly the amplitude of current in said second path after said current in said first path has decayed to a predetermined value.

4. A reset driver circuit for controlling the duration and amplitude of a reset current applied to a conductor which links in a particular sense a group of magnetic memory elements in a multi-group array comprising time dependent source means for providing a source of voltage and for defining a period of time, conductive means for defining a discharge path for said source means including a first and second section, at least a portion of said second section comprising said conductor, and biased asymmetrical conductive means for dividing said period of time into at least two intervals and for providing a low resistance shunt path for a portion of the current conducted through said first section during said first period of time whereby during said first period a first amplitude current is conducted through said second section and during said second period a second amplitude current different from said first amplitude is conducted through said second section.

5. An electrical timing circuit comprising an RC timing means for defining an interval of time, a first current path for discharging said timing means, said path including a first current limiting resistor, a second current path for discharging said timing circuit, said path including a second current limiting resistor, and biased timing means including an asymmetrical current conductive device in said first current path for subdividing said interval of time into at least first and second periods and for regulating the level of current conducted through said first and second current paths during said first and second periods.

6. An electrical circuit for controlling the amplitude and duration of a current pulse conducted through a conductor, comprising RC timing for defining an interval of time, a first current conductive path for discharging a capacitor of said RC timing means at an initial rate, said first path including first resistive means and an asymmetric current conductive means, a second current conductive path for discharging the capacitor of said RC timing means, said second path including said conductor and second resistive means, and control means including said asymmetric current conductive means and means for coupling a source of biasing potential to said asymmetric current inductive means for dividing said interval of time into at least first and second periods and for controlling the conduction of a predetermined amplitude current pulse through said conductor during said first period.

7. The circuit defined in claim 6 wherein said first and second resistive means comprise a pair of substantially equal valued current limiting resistors and additionally including switch means for controlling current conduction through said first and second conductive paths.

8. An electrical circuit for selectively conducting first and second amplitude current pulses through a control winding of a magnetic memory array comprising an electrical conductor linking said magnetic elements in a predetermined sense, first and second resistive means for limiting current in said conductor, first driving means for conducting a first amplitude current through said conductor and said first and second current limiting resistive means in series, second driving means for conducting a second amplitude current through said conductor and one of said resistive means in series, and switching means for selectively shunting the other of said resistive means.

9. The circuit of claim 8 wherein said conductor is capable of ordinarily conducting said first amplitude current pulse without overheating and additionally, including duration control means for timing the operation of said second driving means to prevent overheating said conductor during the conduction of said second amplitude current.

10. The circuit defined in claim 9 wherein said duration control means comprises an RC circuit and voltage divider means for initially charging the capacitor of said RC circuit to a first potential level.

11. The circuit defined in claim 9 additionally including a plurality of conductors similar to said conductor and circuit means for coupling said second driving means to said conductors in parallel.

12. A combined inhibit and reset driving circuit for selectively applying first and second level magnetomotive forces to a group of magnetic elements of a multi-group magnetic memory array comprising an inhibit conductor linking all magnetic elements of one of said groups of magnetic elements in a like sense, first and second resistive means for limiting the current in said conductor, switching means for selectively coupling one or both of said resistive means in series with said conductor, first driving means for conducting said first amplitude current through said conductor and said first and second resistive means in series, and second driving means for conducting said second amplitude current through said conductor and one of said resistive means in series therewith.

13. The circuit of claim 12 wherein said first driving means comprises a logical gated transistorized switch and wherein said second driving means comprises a series RC circuit and voltage divider means for initially charging the capacitor of said series RC circuit to a predetermined potential level.

14. A combined inhibit and reset driver circuit for selectively applying first and second level magnetomotive forces to a group of magnetic elements of a multi-group magnetic memory array comprising a plurality of conductors one of said conductors individually linking each magnetic element of one of said groups in a similar sense, a like plurality of first and second resistive means for limiting current in said conductors, two-position switching means for selectively coupling one of said first resistive means in series with at least one of sad conductors in a first position and for coupling at least one each of said first and second resistive means in series with at least one of said conductors in a second position, first driving means for conducting a first amplitude current through at least one of said conductors and one each of said first and second resistive means in series therewith, and second driving means for conducting a duration and amplitude controlled second amplitude current through at least one of said conductors and one of said resistive means.

15. The circuit of claim 14 wherein said second driving means comprises a duration dependent voltage source means for defining an interval of time, and conductive path means for conducting current from said voltage means, said path means including biased unidirectional current conductive means for subdividing said interval into at least first and second periods and for controlling the conduction of said second amplitude current through said conductor during said first period and for controlling the conduction of a lower amplitude current, initially substantially equal to said first amplitude current, through said conductor during said second period.

References Cited

UNITED STATES PATENTS

| | | | |
|---|---|---|---|
| 2,734,184 | 2/1956 | Rajchman | 340—174 |
| 3,308,445 | 3/1967 | Rajchman | 340—174 |
| 2,902,677 | 9/1959 | Counihan | 340—174 |

JAMES W. MOFFITT, Primary Examiner

PO-1050
(5/69)

UNITED STATES PATENT OFFICE
CERTIFICATE OF CORRECTION

Patent No. 3,496,554 Dated February 17, 1970

Inventor(s) Morris O. Stein

It is certified that error appears in the above-identified patent and that said Letters Patent are hereby corrected as shown below:

In the title, "Magnet" should be --Magnetic--; column 2, line 38, "wehrein" should be --wherein--; column 3, line 53, "group or magnetic" should be --group of magnetic--; column 6, line 15, "minimum" should be --minus--; column 7, line 5, "shown" should be --chosen--; column 7, line 60, "diodes" (first occurrence) should be --diode--; column 9, line 58, "capacitor 74" should be --capacitor 73--; and column 12, line 42, "one of sad" should be --one of said--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents